US011920696B2

(12) United States Patent
Nishikawa

(10) Patent No.: US 11,920,696 B2
(45) Date of Patent: Mar. 5, 2024

(54) GATE VALVE

(71) Applicant: SMC CORPORATION, Tokyo (JP)

(72) Inventor: Takeshi Nishikawa, Abiko (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 18/050,260

(22) Filed: Oct. 27, 2022

(65) Prior Publication Data

US 2023/0139315 A1 May 4, 2023

(30) Foreign Application Priority Data

Oct. 28, 2021 (JP) .................................. 2021-176259

(51) Int. Cl.
| | |
|---|---|
| *F16K 31/163* | (2006.01) |
| *F16K 3/02* | (2006.01) |
| *F16K 3/18* | (2006.01) |
| *F16K 3/312* | (2006.01) |
| *F16K 31/12* | (2006.01) |
| *F16K 31/524* | (2006.01) |
| *F16K 51/02* | (2006.01) |

(52) U.S. Cl.
CPC .......... *F16K 31/163* (2013.01); *F16K 3/0254* (2013.01); *F16K 3/029* (2013.01); *F16K 3/184* (2013.01); *F16K 3/188* (2013.01); *F16K 3/312* (2013.01); *F16K 31/12* (2013.01); *F16K 31/52475* (2013.01); *F16K 51/02* (2013.01)

(58) Field of Classification Search
CPC ...... F16K 31/163; F16K 3/0254; F16K 3/029; F16K 3/188; F16K 51/02; F16K 3/184; F16K 31/12; F16K 31/52475; F16K 3/312; H01L 21/67017

USPC .......................................................... 251/203
See application file for complete search history.

(56) References Cited

U.S. PATENT DOCUMENTS

| | | | | |
|---|---|---|---|---|
| 6,390,449 B1 * | 5/2002 | Ishigaki | ................... | F16K 3/184 |
| | | | | 251/193 |
| 7,066,443 B2 * | 6/2006 | Ishigaki | ................... | F16K 3/184 |
| | | | | 251/195 |
| 8,800,956 B2 * | 8/2014 | Ishigaki | ................... | F16K 3/184 |
| | | | | 251/203 |
| 2004/0129910 A1 | 7/2004 | Ishigaki | | |

(Continued)

FOREIGN PATENT DOCUMENTS

| | | |
|---|---|---|
| JP | 2004-197769 A | 7/2004 |
| JP | 2015-17655 A | 1/2015 |

OTHER PUBLICATIONS

Extended European Search Report dated Mar. 23, 2023 in European Patent Application No. 22200169.5, citing reference 1 therein, 12 pages

*Primary Examiner* — John Bastianelli
(74) *Attorney, Agent, or Firm* — Oblon, McClelland, Maier & Neustadt, L.L.P.

(57) ABSTRACT

A first opening and closing mechanism, which includes a first cam groove and a first cam roller and which causes a valve assembly to reciprocate between an intermediate position and a first closed position, and a second opening and closing mechanism, which includes a second cam groove and a second cam roller and which causes the valve assembly to reciprocate between the intermediate position and a second closed position, are provided so as to be operable separately, the first and second opening and closing mechanisms being disposed adjacent to each other in a thickness direction D of a gate valve.

9 Claims, 12 Drawing Sheets

(56) References Cited

U.S. PATENT DOCUMENTS

| | | |
|---|---|---|
| 2006/0202147 A1 | 9/2006 | Ishigaki |
| 2015/0014556 A1 | 1/2015 | Ishigaki et al. |
| 2018/0119822 A1* | 5/2018 | Iwabuchi ................ F16K 3/184 |
| 2020/0355275 A1 | 11/2020 | Yabe et al. |

* cited by examiner

GATE VALVE

TECHNICAL FIELD

The present invention relates to a gate valve to be disposed between a pair of chambers in, for example, a semiconductor manufacturing apparatus. More specifically, the present invention relates to a gate valve to be disposed between a first chamber such as a process chamber and a second chamber such as a transfer chamber, the first chamber and the second chamber being adjacent to each other, the gate valve being usable for causing a first opening communicating with the first chamber and a second opening communicating with the second chamber to communicate with each other and for opening and closing the first opening and the second opening separately.

BACKGROUND ART

Known examples of such a gate valve include gate valves disclosed in PTL 1 and PTL 2. The existing gate valves include a valve assembly including a pair of valve plates, a valve shaft having a tip end portion to which the valve assembly is attached, and a drive mechanism connected to the valve shaft. Then, by operation of the valve shaft driven by the drive mechanism, the existing gate valves are capable of moving the valve assembly sequentially to a retracted position where such a first opening and such a second opening communicate with each other, and a first closed position and a second closed position where the pair of valve plates come into contact with the first opening and the second opening separately to airtightly close the openings.

Meanwhile, the drive mechanism of each existing gate valve guides the operation of the valve shaft for moving the valve assembly to each position from both the left and right sides. Thus, one cam groove is provided on each of both the left and right sides of the valve shaft so as to extend in an up-down direction, that is, the height direction along the axis of the valve shaft.

However, to enable the valve assembly to move sequentially to each position by using the one cam groove extending in the up-down direction in this manner, the drive mechanism is increased in height, thus increasing the height of the entire gate valve.

When the height of the entire gate valve is increased in this manner, there may be a case in which the gate valve cannot be installed due to the space, between a pair of chambers, for installing the gate valve. Thus, also in terms of reducing the size of the entire equipment, it is desirable to minimize the height of the entire gate valve.

CITATION LIST

Patent Literature

[PTL 1]: Japanese Unexamined Patent Application Publication No. 2004-197769
[PTL 2]: Japanese Unexamined Patent Application Publication No. 2015-017655

SUMMARY OF INVENTION

Technical Problem

Thus, a technical object of the present invention is to provide a gate valve to be disposed between chambers adjacent to each other, the gate valve being usable for causing openings communicating with the respective chambers to communicate with each other and for opening and closing the openings separately by operation of a valve shaft driven by a drive mechanism to move a pair of valve plates attached to the valve shaft, the height of the entire gate valve being able to be reduced.

Solution to Problem

To solve the problem, a gate valve according to the present invention is disposed between a first chamber and a second chamber adjacent to each other, the gate valve being usable for causing a first opening communicating with the first chamber and a second opening communicating with the second chamber to communicate with each other and for opening and closing the first opening and the second opening separately. The gate valve includes: a bonnet partitioning off an upper side and a lower side; a valve shaft passing through the bonnet in a direction along an axis extending in an up-down direction, the valve shaft having a tip end portion disposed above the bonnet and a base end portion disposed below the bonnet; a valve assembly formed by attaching a first valve plate and a second valve plate back to back to the tip end portion of the valve shaft; and a valve drive mechanism connected to the base end portion of the valve shaft, the valve drive mechanism being configured to move the valve assembly by operation of the valve shaft. The valve drive mechanism includes an air cylinder including a first drive rod and a second drive rod capable of being driven separately, the air cylinder being fixedly provided to the bonnet, and a power transmission mechanism connecting the valve shaft and both the first drive rod and the second drive rod, the power transmission mechanism being configured to transmit driving force of the air cylinder to the valve shaft and is thus capable of moving the valve assembly in the direction along the axis and a thickness direction orthogonal to the axis to move the valve assembly to a first closed position for closing the first opening with the first valve plate, a second closed position for closing the second opening with the second valve plate, and a retracted position for causing the openings to communicate with each other. The power transmission mechanism includes a first cam frame connected to the first drive rod to operate together with the first drive rod, a second cam frame connected to the second drive rod to operate together with the second drive rod, a lever member attached to the base end portion of the valve shaft, and a first opening and closing mechanism and a second opening and closing mechanism configured to separately cause the valve assembly to reciprocate in the thickness direction. The first opening and closing mechanism includes a first cam groove provided in one of the first cam frame and the lever member, and a first cam roller provided on another of the first cam frame and the lever member, the first cam roller being slidably fitted into the first cam groove, and the second opening and closing mechanism includes a second cam groove provided in one of the second cam frame and the lever member, and a second cam roller provided on another of the second cam frame and the lever member, the second cam roller being slidably fitted into the second cam groove. The first cam roller reciprocates together with reciprocation of the first drive rod so as to follow the first cam groove, thus causing the valve assembly to reciprocate between a position occupied by the retracted position and a position occupied by the first closed position in the thickness direction, and the second cam roller reciprocates together with reciprocation of the second drive rod so as to follow the second cam groove, thus causing the valve assembly to reciprocate between the position occupied by the retracted position and a position occupied by the second closed position in the thickness direction.

In the present invention, preferably, the gate valve has a width direction orthogonal to both the direction along the axis and the thickness direction, and at the first opening and closing mechanism and the second opening and closing mechanism, the first and second cam frames are disposed on both sides of the lever member in the width direction and are provided on both the sides of the lever member so as to be adjacent to each other in the thickness direction. More preferably, the first cam groove has a first recess for letting the first cam roller therein when the valve assembly is moved to the second closed position, and the second cam groove has a second recess for letting the second cam roller therein when the valve assembly is moved to the first closed position.

In addition, in the present invention, for example, the valve assembly may be capable of further moving to an intermediate position located between the position occupied by the retracted position and the position occupied by the first and second closed positions in the direction along the axis, the power transmission mechanism may further include a first spring member and a second spring member provided between the lever member and both the first drive rod and the second drive rod to transmit driving force of the first drive rod to the lever member through the first spring member and to transmit driving force of the second drive rod to the lever member through the second spring member, the power transmission mechanism may further include a stopper configured to, when the valve assembly reaches the intermediate position from the retracted position by driving of the air cylinder, stop operation of the lever member in the direction along the axis and allow the lever member to be operated in the thickness direction by the opening and closing mechanisms, and in a state in which the operation of the lever member in the direction along the axis is stopped by the stopper, the opening and closing mechanisms may be configured to separately cause the valve assembly to reciprocate between the intermediate position and the first and second closed positions when the first and second drive rods are separately driven.

Then, preferably, the intermediate position is located at the position occupied by the first and second closed positions in the direction along the axis. In addition, preferably, the gate valve has a width direction orthogonal to both the direction along the axis and the thickness direction, at the first opening and closing mechanism and the second opening and closing mechanism, the first and second cam frames are disposed on both sides of the lever member in the width direction and are provided on both the sides of the lever member so as to be adjacent to each other in the thickness direction, and a first support frame and a second support frame relatively movably connected to the lever member are respectively attached to the first drive rod and the second drive rod, and a pair of the first cam frames are provided upright in the direction along the axis from the first support frame, the first support frame and the lever member being connected by the first spring member between the pair of the first cam frames in the width direction, and a pair of the second cam frames are provided upright in the direction along the axis from the second support frame, the second support frame and the lever member being connected by the second spring member between the pair of the second cam frames in the width direction.

Then, more preferably, the first cam groove has a first recess for letting the first cam roller therein when the valve assembly is moved from the intermediate position to the second closed position, and the second cam groove has a second recess for letting the second cam roller therein when the valve assembly is moved from the intermediate position to the first closed position.

In addition, in the present invention, the power transmission mechanism may further include a guide frame fixedly provided to the bonnet, and first and second guide mechanisms provided between the guide frame and the first and second cam frames, the first and second guide mechanisms being configured to guide the cam frames so as to move in the direction along the axis, and the first guide mechanism may include a first guide groove provided, along the axis, in one of the guide frame and the first cam frame, and a first guide roller provided on another of the guide frame and the first cam frame, the first guide roller being slidably fitted into the first guide groove, and the second guide mechanism may include a second guide groove provided, along the axis, in one of the guide frame and the second cam frame, and a second guide roller provided on another of the guide frame and the second cam frame, the second guide roller being slidably fitted into the second guide groove.

Then, preferably, the guide frame is disposed on both the sides of the lever member in the width direction so as to be located outside, in the width direction, the first and second cam frames provided adjacent to each other in the thickness direction. In addition, more preferably, the air cylinder is disposed on both the sides of the lever member in the width direction so as to be drooped from the bonnet along the axis, and the guide frame is disposed inside each air cylinder in the width direction, the first drive rod and the second drive rod are provided to each of a pair of the air cylinders so as to be adjacent to each other in the thickness direction, and the first drive rods of the pair of the air cylinders are attached to respective end portions of the first support frame, and the second drive rods of the pair of the air cylinders are attached to respective end portions of the second support frame.

Advantageous Effects of Invention

The gate valve according to the present invention includes the first opening and closing mechanism and the second opening and closing mechanism including the respective separate cam grooves to separately cause the valve assembly to reciprocate, in the thickness direction, between the position occupied by the retracted position and the position occupied by the first closed position and between the position occupied by the retracted position and the position occupied by the second closed position. Thus, the present invention enables a reduction in the height of the first and second cam frames including the respective cam grooves and thus enables a reduction in the height of the entire gate valve.

DESCRIPTION OF EMBODIMENTS

Figure 1:
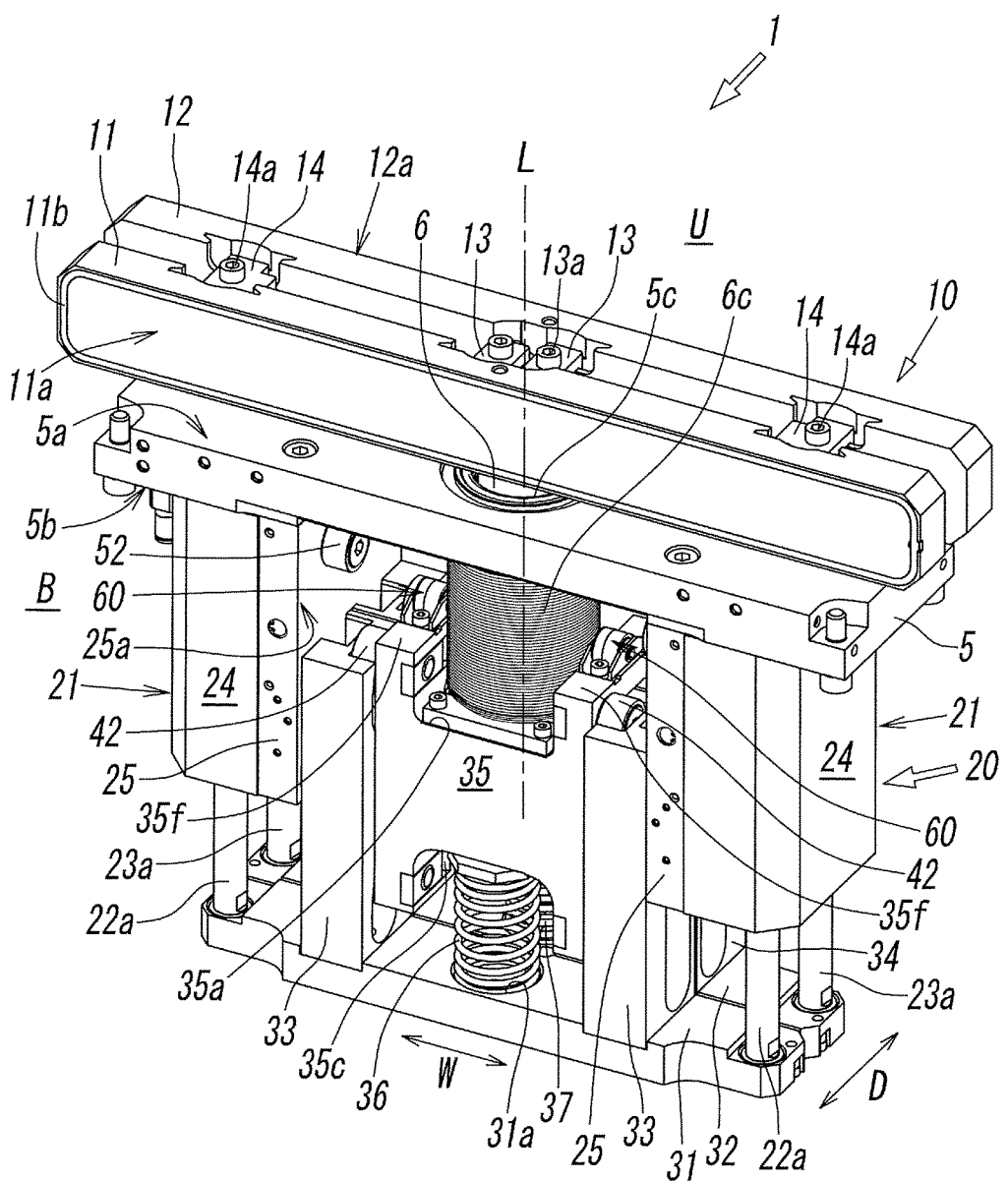
FIG. 1 is an external view illustrating an embodiment of a gate valve according to the present invention.

As illustrated in FIGS. 5 to 12, a gate valve 1 illustrated in FIG. 1, which is an embodiment of the present invention, is disposed, in, for example, a semiconductor manufacturing apparatus, between a process chamber (first chamber) 2 and a transfer chamber (second chamber) 3, the first chamber 2 and the second chamber 3 being adjacent to each other. Thus, the gate valve 1 is usable for causing a first opening 4a, which communicates with the first chamber 2, and a second opening 4b, which communicates with the second chamber 3, to communicate with each other and for opening and closing the first opening 4a and the second opening 4b separately.

The gate valve 1 includes a bonnet 5, which forms the boundary between an upper region U and a lower region B to partition off the regions U and B, a valve shaft 6, which passes through the bonnet 5 in the direction along an axis L extending in an up-down direction and which has a tip end portion 6a disposed in the upper region U above the bonnet 5 and a base end portion 6b disposed in the lower region B below the bonnet 5, a valve assembly 10, which is formed by providing a first valve plate 11 and a second valve plate 12 back to back to the tip end portion 6a of the valve shaft 6 so as to be adjacent to each other, and a valve drive mechanism 20, which is connected to the base end portion 6b of the valve shaft 6 and which is configured to move the valve assembly 10 by operation of the valve shaft 6.

The bonnet 5 is made of a metal plate having a substantially rectangular shape that is long in a width direction W orthogonal to the axis L. The bonnet 5 has a first surface (upper surface) 5a, which faces the upper region U, a second surface (lower surface) 5b, which faces the lower region B, and a through hole 5c, into which the valve shaft 6 is inserted. As illustrated in FIGS. 5 to 12, the bonnet 5 forms a bottom wall of a valve casing 7, which has a hollow shape whose lower side is open. The valve casing 7 has side walls 8, which surround the four sides around the axis L. A lower end opening of the side walls 8 can be airtightly closed by detachably attaching the bonnet 5 to a lower end portion of each of the side walls 8 in the direction along the axis L.

In this manner, the bonnet 5 is attached to the valve casing 7. Thus, the valve assembly 10 attached to the tip end portion 6a of the valve shaft 6 is configured to be accommodated in the valve casing 7. In addition, the through hole 5c allows the valve assembly 10 to move in the direction along the axis L and in a thickness direction D orthogonal to the direction along the axis L and the width direction W (that is, in the direction in which the first valve plate 11 and the second valve plate 12 of the valve assembly 10 are provided adjacent to each other). Thus, the through hole 5c has an inner diameter slightly larger than the outer diameter of the valve shaft 6 and is provided at the center of the bonnet 5 so as to pass therethrough.

The valve assembly 10 includes the first valve plate 11 and the second valve plate 12, which have a substantially rectangular shape that is long in the width direction W, and first clamp members 13 and second clamp members 14 for detachably fixing the valve plates 11 and 12 to the tip end portion 6a of the valve shaft 6. The first valve plate 11 and the second valve plate 12 are located back to back in the thickness direction D and respectively have a first sealing surface 11a and a second sealing surface 12a, which are parallel to each other. Valve sealing members 11b and 12b, which are, for example, O-rings having an annular shape, are attached to the peripheries of the sealing surfaces 11a and 12a, respectively. In addition, the pair of valve sealing surfaces 11a and 12a do not necessarily have to be parallel to each other.

The first clamp members 13 are engaged, from above, with respective two parts of the valve assembly 10 at the center thereof in the width direction W so as to be fitted thereinto and to extend between the first valve plate 11 and the tip end of the valve shaft 6 and between the second valve plate 12 and the tip end of the valve shaft 6. In addition, the second clamp members 14 are engaged, from above, with respective end portions of the valve assembly 10 in the width direction W so as to be fitted thereinto and to extend between the first valve plate 11 and the second valve plate 12. Then, spacer members 15 are held, by inner surfaces of the pair of valve plates 11 and 12, between the first valve plate 11 and the second valve plate 12 and below the second clamp members 14 (FIGS. 5 to 12).

Then, when the first clamp members 13 are fixed to the tip end of the valve shaft 6 with fastening bolts 13a from above in a state in which the first valve plate 11 and the second valve plate 12 are engaged, from above, with respective end portions of the tip end portion 6a closer to the base end so as to be fitted thereinto, inclined surfaces having different inclinations of the parts that are engaged so as to be fitted to each other are in pressure contact with each other. As a result, at the center of the valve assembly 10 in the width direction W, in a state in which the tip end portion 6a of the valve shaft 6 is held by the inner surfaces of the first valve plate 11 and the second valve plate 12, the valve shaft 6 and the valve plates 11 and 12 are fastened to each other in the thickness direction D.

On the other hand, at the respective end portions of the valve assembly 10 in the width direction W, when the second clamp members 14 are fixed to the respective tip ends of the spacer members 15 with fastening bolts 14a from above in a state in which the first valve plate 11 and the second valve plate 12 are engaged, from above, with respective end portions of the second clamp members 14 closer to the base end so as to be fitted thereinto, inclined surfaces having different inclinations of the parts that are engaged so as to be fitted to each other are in pressure contact with each other. As a result, at the respective end portions of the valve assembly 10 in the width direction W, in a state in which the spacer members 15 are held by the inner surfaces of the first valve plate 11 and the second valve plate 12, the spacer members 15 and the valve plates 11 and 12 are fastened to each other in the thickness direction D.

In this connection, such a specific structure in which the first valve plate 11 and the second valve plate 12 are attached to the valve shaft 6 is described in a prior Japanese patent application (Japanese Patent Application No. 2021-168188) by the present applicant. In addition, in the present application, the structure of the valve assembly 10 and the structure in which the valve plates 11 and 12 are attached to the valve shaft 6 are not limited to the structures described above, and it is possible to adopt various commonly known structures. Thus, more specific descriptions related thereto are omitted here.

Meanwhile, as illustrated in FIGS. 5 to 12, the valve casing 7 is attached between the first chamber 2 and the second chamber 3 and is formed by detachably attaching, to an upper end opening of the side walls 8 in the direction along the axis L, a top wall 9, which airtightly closes the opening. By detachably attaching the top wall 9 to the side walls 8 in this manner, various operations such as detachment of the valve plates 11 and 12 can be performed through the upper end opening of the side walls 8 during maintenance of the valve assembly 10 such as replacement of the valve sealing members 11b and 12b of the valve plates 11 and 12.

In addition, the side walls 8 of the valve casing have a first inner side surface 8a and a second inner side surface 8b, which face parallel to each other with the axis L interposed therebetween in the thickness direction D. The first inner side surface 8a has the first opening 4a, which is open and communicates with the first chamber 2. The second inner side surface 8b has the second opening 4b, which is open and communicates with the second chamber 3. The first opening 4a and the second opening 4b are disposed so as to face each other in the thickness direction D. In addition, valve seats 4c for coming into contact with and separating from each valve sealing member 11b, 12b of the first and second sealing surfaces 11a, 12a of the valve assembly 10 are formed around the first opening 4a and the second opening 4b of the first inner side surface 8a and the second inner side surface 8b so as to surround the openings 4a and 4b.

Then, by operation of the valve shaft 6 driven by the valve drive mechanism 20, the gate valve 1 mounted on such a valve casing 7 is capable of moving the valve assembly 10 in the valve casing 7 to a retracted position (FIGS. 5 and 6) located on the axis L for causing the first opening 4a and the second opening 4b to communicate with each other, a first closed position (FIGS. 9 and 10) for airtightly closing the first opening 4a with the first valve plate 11, a second closed position (FIGS. 11 and 12) for airtightly closing the second opening 4b with the second valve plate 12, and an intermediate position (FIGS. 7 and 8) set to the same height position, on the axis L, as the height position occupied by the first and second closed positions. In this connection, the valve assembly 10 located at the intermediate position is separated from both the first opening 4a and the second opening 4b.

Figure 2:
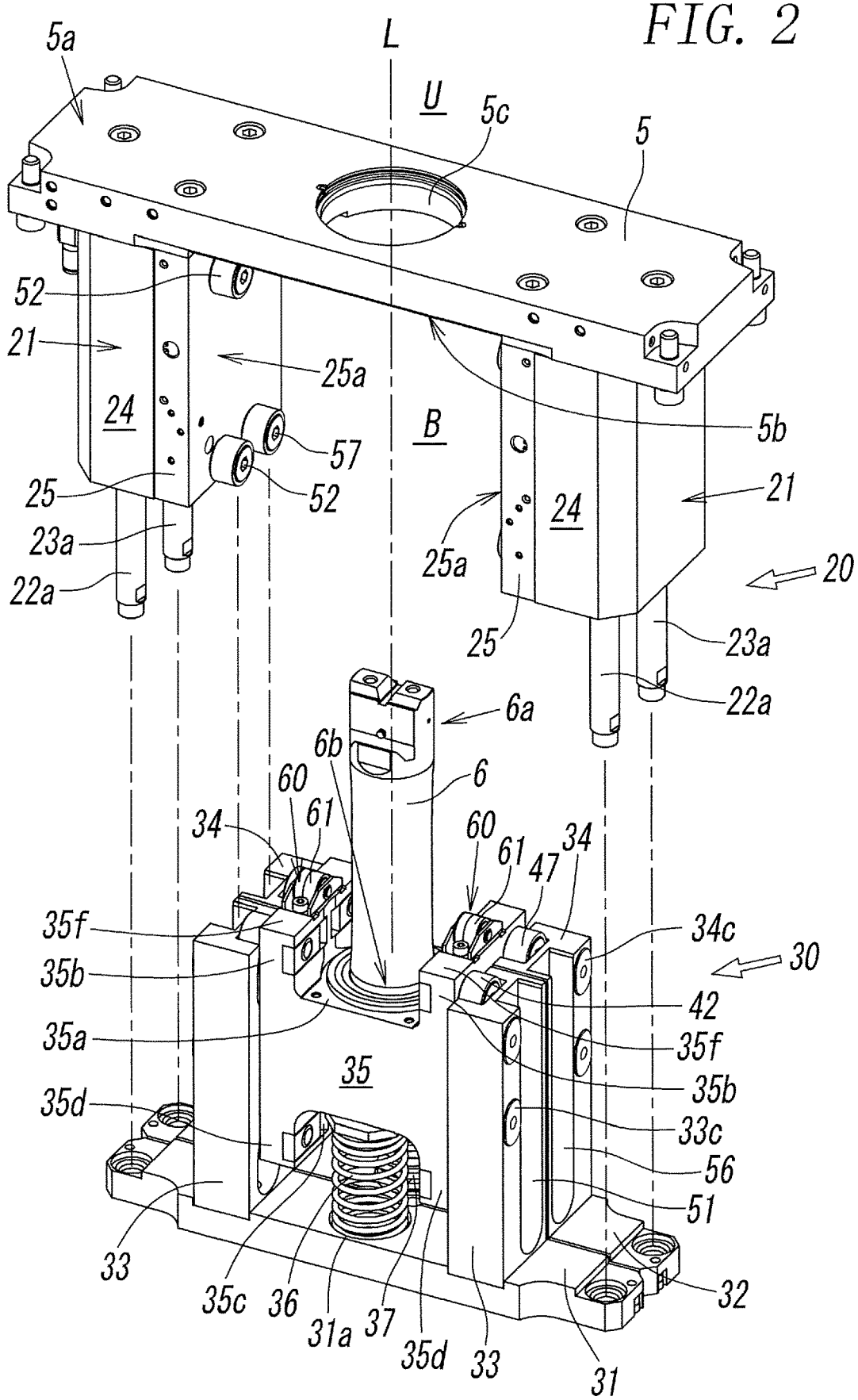
FIG. 2 is an exploded perspective view in which a valve drive mechanism is divided into air cylinders and a power transmission mechanism.
Figure 3:
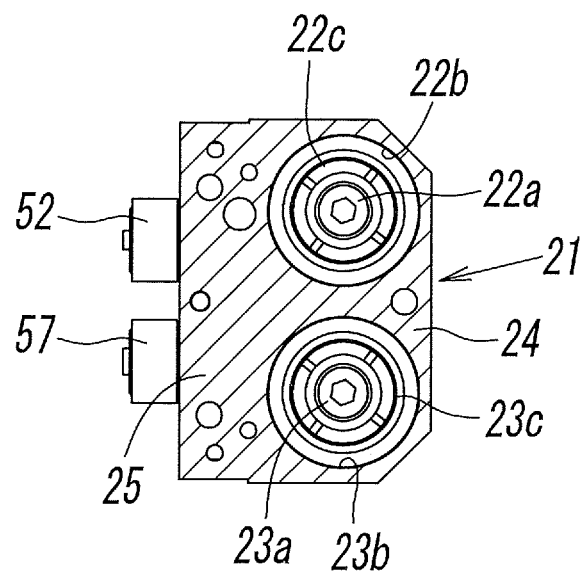
FIG. 3 is a sectional view of a main part of the air cylinder in FIG. 2.

As illustrated in FIGS. 1 to 3, the valve drive mechanism 20 configured to operate the valve assembly 10 in this manner includes air cylinders 21, each of which includes a first drive rod 22a and a second drive rod 23a capable of being driven separately, and a power transmission mechanism 30, which connects the base end portion of the valve shaft 6 and the first drive rod 22a and the second drive rod 23a and which is configured to transmit driving force of the air cylinders 21 to the valve shaft 6.

As illustrated in FIG. 3, the air cylinder 21 includes a cylinder body 24, a first cylinder hole 22b and a second cylinder hole 23b, which are provided in the cylinder body 24 so as to extend along the axis L, and a pair of pistons 22c and 23c, which are slidably provided in the pair of cylinder holes 22b and 23b, respectively. Respective base end portions of the first drive rod 22a and the second drive rod 23a are fixed to the pair of pistons 22c and 23c. Then, the air cylinder 21 is drooped from the bonnet 5 along the axis L by fixedly attaching an end portion of the cylinder body 24 closer to the head to the second surface 5b of the bonnet 5, the second surface 5b facing downward.

Thus, the tip end side of each of the first drive rod 22a and the second drive rod 23a extends downward from an end portion of the cylinder body 24 closer to the rods so as to be capable of advancing and retracting. In addition, it is possible to supply and discharge air separately into and from the first cylinder hole 22b and the second cylinder hole 23b. Thus, it is possible to drive the first drive rod 22a and the second drive rod 23a separately.

Figure 4:
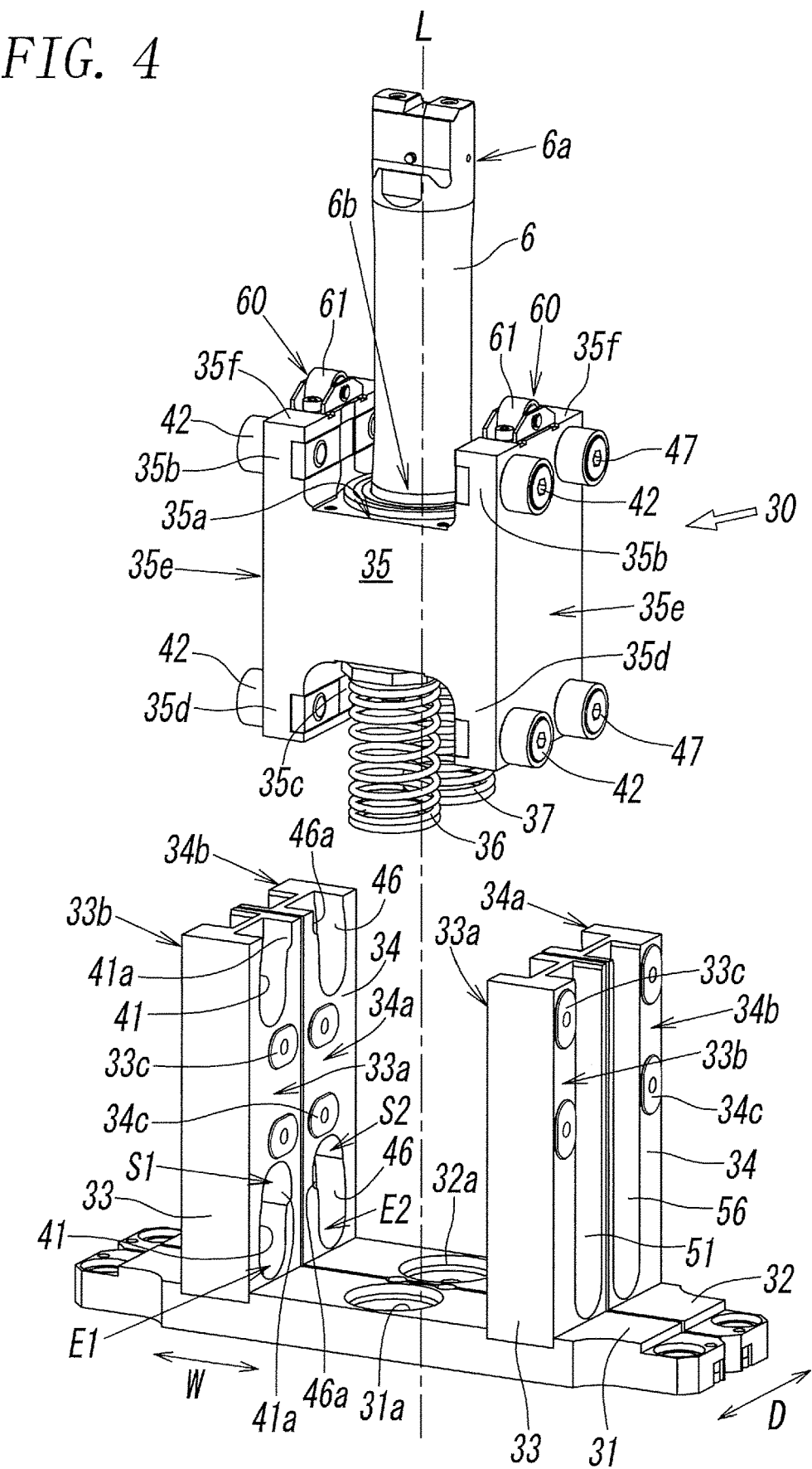
FIG. 4 is an exploded perspective view of the power transmission mechanism in FIG. 2.

As illustrated in FIGS. 2 and 4, the power transmission mechanism 30 includes a first support frame 31 and a second support frame 32, which are respectively attached to the first drive rod 22a and the second drive rod 23a, first cam frames 33 and second cam frames 34, which are fixedly attached to the first support frame 31 and the second support frame 32, respectively, and which extend along the axis L, a lever member 35, which is fixedly attached to the base end portion 6b of the valve shaft 6 and which is configured to operate together with the valve shaft 6, and a first spring member 36 and a second spring member 37, which connect the lever member 35 and both the first support frame 31 and the second support frame 32, respectively, so as to be capable of being relatively displaced. Then, as described below, in particular, the power transmission mechanism 30 is formed symmetrically in the thickness direction D relative to a central plane that includes the axis L and that extends in the width direction W. In addition, the power transmission mechanism 30 is formed symmetrically in the width direction W relative to a central plane that includes the axis L and that extends in the thickness direction D. Furthermore, in the present embodiment, similarly, the entire gate valve 1 is formed substantially symmetrically in the width direction W and the thickness direction D.

In this manner, the first spring member 36 and the second spring member 37 are provided (specifically, provided in a compressed state) between the lever member 35 and both the first support frame 31 and the second support frame 32, respectively. Thus, driving force of the first drive rod 22a and the second drive rod 23a is transmitted separately to the lever member 35 through the first spring member 36 and the second spring member 37. As a result, it is possible to relatively operate the lever member 35 and each of the first drive rod 22a and the second drive rod 23a.

More specifically, in the present embodiment, the air cylinder 21 is fixedly attached to the bonnet 5 in a state in which the first cylinder hole 22b, the piston 22c, and the first drive rod 22a are disposed closer to the first closed position and in which the second cylinder hole 23b, the piston 23c, and the second drive rod 23a are disposed closer to the second closed position. That is, the first drive rod 22a and the second drive rod 23a are adjacent to each other in the thickness direction D such that the first drive rod 22a is disposed closer to the first closed position and the second drive rod 23a is disposed closer to the second closed position. Then, the pair of air cylinders 21 formed in this manner are disposed on respective sides between which the valve shaft 6 (that is, the axis L) is interposed in the width direction W. However, the number and the disposition of the air cylinders 21 are not limited to those in the present embodiment.

The first support frame 31 and the second support frame 32 are each made of a metal plate that is long in the width direction W. Tip end portions of the first drive rods 22a of the pair of air cylinders 21 are attached to respective end portions of the first support frame 31 between which the axis L is interposed in the width direction W. Tip end portions of the second drive rods 23a of the pair of air cylinders 21 are attached to respective end portions of the second support frame 32 between which the axis L is interposed in the width direction W.

Thus, the first support frame 31 and the second support frame 32 are provided adjacent to each other in the thickness direction D such that the first support frame 31 is disposed closer to the first closed position and the second support frame 32 is disposed closer to the second closed position. In addition, spring seats 31a and 32a, which are recessed, are provided at the respective centers of the support frames 31 and 32 in the width direction W. The spring seats 31a and 32a receive respective lower end portions of the first spring member 36 and the second spring member 37 in the direction along the axis L.

The first cam frame 33 and the second cam frame 34 are each made of a metal plate. The first cam frame 33 has an inner surface 33a and an outer surface 33b, which are located back to back so as to extend in the direction along the axis L and the thickness direction D. The second cam frame 34 has an inner surface 34a and an outer surface 34b, which are located back to back so as to extend in the direction along the axis L and the thickness direction D. Then, a pair of the first cam frames 33 are fixedly provided upright, between the pair of air cylinders 21, from respective sides of the first support frame 31 between which the axis L is interposed. Similarly, a pair of the second cam frames 34 are fixedly provided upright, between the pair of air cylinders 21, from respective sides of the second support frame 32 between which the axis L is interposed.

Thus, the first cam frame 33 and the second cam frame 34 are provided adjacent to each other in the thickness direction D such that the first cam frame 33 is disposed closer to the first closed position and the second cam frame 34 is disposed closer to the second closed position. Then, the cam frames 33 and 34 adjacent to each other are formed symmetrically in the thickness direction D relative to a central plane that includes the axis L and that extends in the width direction W. On the other hand, of the pair of first cam frames 33, the inner surfaces 33a face each other, and the outer surfaces 33b are located back to back. In addition, of the pair of second cam frames 34, the inner surfaces 34a face each other, and the outer surfaces 34b are located back to back. Then, the pair of first cam frames 33 are disposed symmetrically in the width direction W relative to a central plane that includes the axis L and that extends in the thickness direction D. In addition, the pair of second cam frames 34 are disposed symmetrically in the width direction W relative to a central plane that includes the axis L and that extends in the thickness direction D.

The lever member 35 is made of a metal block having an H shape in front view. The lever member 35 has an upper recess 35a, which is closer to the upper end in the direction along the axis L and which is formed at the center thereof in the width direction W, a pair of upper projections 35b, which project from respective side portions thereof, a lower recess 35c, which is closer to the lower end in the direction along the axis L and which is formed at the center thereof in the width direction W, and a pair of lower projections 35d, which project from the respective side portions thereof. In addition, the lever member 35 has a pair of side surfaces 35e, which are located back to back at respective ends thereof in the width direction W.

Then, the base end portion 6b of the valve shaft 6 is fixedly attached to the upper recess 35a. A bellows 6c, which has a cylindrical shape, airtightly surrounds the valve shaft 6 between the upper recess 35a of the lever member 35 and the through hole 5c of the bonnet 5. In addition, an upper end portion of each of the first spring member 36 and the second spring member 37 in the direction along the axis L is attached to the lower recess 35c.

The first spring member 36 and the second spring member 37 are each made of a metal coil spring and have spring force (spring stiffness) sufficient to support the weight of each of the valve assembly 10 and the lever member 35. Thus, in the process of moving the assembly 10 along the axis L from the retracted position (FIGS. 5 and 6) to the intermediate position (FIGS. 7 and 8), spring force of the spring members 36 and 37 enables the valve assembly 10 and the drive rods 22a and 23a of the air cylinder 21 to operate together.

Then, in the process in which opening and closing mechanisms 40 and 45, which will be described later, move the assembly 10 in the thickness direction D from the intermediate position to the first and second closed positions, the spring members 36 and 37 are compressed and deformed by driving force of the drive rods 22a and 23a. As a result, it is possible to move the valve assembly 10 relative to the drive rods 22a and 23a and to thus move the valve assembly 10 in the thickness direction D, which is orthogonal to the direction in which the drive rods 22a and 23a operate (direction along the axis L).

In addition, the power transmission mechanism 30 includes first opening and closing mechanisms 40 and second opening and closing mechanisms 45, which serve for operation of the valve shaft 6 and the valve assembly 10 in the thickness direction D and which separately cause the valve assembly 10 to reciprocate, in the thickness direction D, between the position occupied by the retracted position and the position occupied by the first closed position and between the position occupied by the retracted position and the position occupied by the second closed position, first guide mechanisms 50 and second guide mechanisms 55, which serve for guiding the first cam frames 33 and the second cam frames 34 so as to reciprocate in the direction along the axis L and which guide the cam frames 33 and 34 so as to reciprocate between the position occupied by the retracted position and the position occupied by the intermediate position in the direction along the axis L, and stoppers 60, which cause the lever member 35 to be in contact with the second surface 5b of the bonnet 5 at the intermediate position to prevent the valve shaft 6 and the valve assembly 10 together with the lever member 35 from moving in the direction along the axis L and to allow the valve shaft 6 and the valve assembly 10 together with the lever member 35 to move in the thickness direction D.

The first opening and closing mechanisms 40 and the second opening and closing mechanisms 45 are formed so as to extend between the first and second cam frames 33 and 34 and the lever member 35 disposed between the cam frames 33 and 34. Specifically, the first opening and closing mechanisms 40 and the second opening and closing mechanisms 45 are provided between the respective inner surfaces 33a and 34a of the first and second cam frames 33 and 34 and the side surfaces 35e of the lever member 35, the side surfaces 35e facing the inner surfaces 33a and 34a. In addition, the opening and closing mechanisms 40 and 45 are provided adjacent to each other in the thickness direction D such that the first opening and closing mechanism 40 is disposed closer to the first closed position and the second opening and closing mechanism 45 is disposed closer to the second closed position.

The first opening and closing mechanism 40 includes first cam grooves 41, which are recessed and provided in the inner surface 33a of the first cam frame 33, and first cam rollers 42, which are provided on the side surface 35e of the lever member 35, the side surface 35e facing the first cam grooves 41, and which are slidably fitted into the respective first cam grooves 41. On the other hand, the second opening and closing mechanism 45 includes second cam grooves 46, which are recessed and provided in the inner surface 34a of the second cam frame 34, and second cam rollers 47, which are provided on the side surface 35e of the lever member 35, the side surface 35e facing the second cam grooves 46, and which are slidably fitted into the respective second cam grooves 46. In the present embodiment, the first opening and closing mechanisms 40 and the second opening and closing mechanisms 45 formed in this manner are provided so as to form pairs located closer to respective side surfaces 35e of the lever member 35.

The first cam groove 41 has a beginning end position S1, which is closer to the upper end in the direction along the axis L, and a terminal end position E1, which is closer to the lower end in the direction along the axis L. The terminal end position E1 is located closer than the beginning end position S1 to the first closed position in the thickness direction D. That is, the first cam groove 41 has a profile inclined toward the first closed position in a direction from the beginning end position S1 closer to the upper end toward the terminal end position E1 closer to the lower end. Then, when the first cam roller 42 is located at the beginning end position S1, the valve assembly 10 is disposed on the axis L. When the first cam roller 42 is located at the terminal end position E1, the valve assembly 10 is disposed at the first closed position. In the present embodiment, the two first cam grooves 41 having the same shape are formed at an upper end portion and a lower end portion of the first cam frame 33. One of the two first cam grooves 41 that is disposed closer to the upper end is open in an upper end face of the first cam frame 33 at the beginning end position S1.

On the other hand, the second cam groove 46 has a beginning end position S2, which is closer to the upper end in the direction along the axis L, and a terminal end position E2, which is closer to the lower end in the direction along the axis L. The terminal end position E2 is located closer than the beginning end position S2 to the second closed position in the thickness direction D. That is, the second cam groove 46 has a profile inclined toward the second closed position in a direction from the beginning end position S2 closer to the upper end toward the terminal end position E2 closer to the lower end. Then, when the second cam roller 47 is located at the beginning end position S2, the valve assembly 10 is disposed on the axis L. When the second cam roller 47 is located at the terminal end position E2, the valve assembly 10 is disposed at the second closed position. In the present embodiment, the two second cam grooves 46 having the same shape are formed at an upper end portion and a lower end portion of the second cam frame 34. One of the two second cam grooves 46 that is disposed closer to the upper end is open in an upper end face of the second cam frame 34 at the beginning end position S2.

In this manner, when one of the first cam frame 33 and the second cam frame 34 moves upward in the direction along the axis L relative to the lever member 35, the cam rollers fitted into the cam grooves of the moved cam frame move from the beginning end position S to the terminal end position E so as to follow the cam grooves. Then, the lever member 35 is displaced in the thickness direction D toward one of the first closed position and the second closed position. Simultaneously with this, the cam rollers fitted into the other remaining cam frame also have to be displaced by the same length in the thickness direction D.

Thus, in the gate valve 1, all the (two upper and lower) cam grooves 41 formed in the first cam frame 33 have a first recess 41a, which is provided so as to be recessed in the thickness direction D from the beginning end position S1 toward the second closed position, and all the (two upper and lower) cam grooves 46 formed in the second cam frame 34 have a second recess 46a, which is provided so as to be recessed in the thickness direction D from the beginning end position S2 toward the first closed position.

In addition, sliding members 33c and 34c that are made of a resin material and that are usable for sliding relative to both side surfaces 35e of the lever member 35 are respectively provided on the inner surfaces 33a and 34a of the first cam frame 33 and the second cam frame 34, the sliding members 33c being arranged in the up-down direction, the sliding members 34c being arranged in the up-down direction. On the other hand, similarly, sliding members 33c and 34c that are made of a resin material and that are usable for sliding relative to guide surfaces 25a of guide frames 25 described later are respectively provided on the outer surfaces 33b and 34b of the first cam frame 33 and the second cam frame 34, the sliding members 33c being arranged in the up-down direction, the sliding members 34c being arranged in the up-down direction. However, the number and the positions of the sliding members 33c and 34c are not limited thereto.

Furthermore, the power transmission mechanism 30 includes the guide frames 25, each of which is fixedly attached to the bonnet 5 between the air cylinder 21 and the cam frames 33 and 34 and which are drooped from the second surface 5b of the bonnet 5. The guide frame 25 has the guide surface 25a, which faces the outer surfaces 33b and 34b of the cam frames 33 and 34. In the present embodiment, the pair of guide frames 25 formed in this manner are disposed on the respective sides between which the axis L is interposed in the width direction W. The guide frame 25 is integrally formed with the cylinder body 24 of the air cylinder 21 adjacent to the guide frame 25 in the width direction W.

Then, the first guide mechanisms 50 and the second guide mechanisms 55 are formed so as to extend between the guide frames 25 and the first and second cam frames 33 and 34 adjacent to the guide frames 25. Specifically, the first guide mechanisms 50 and the second guide mechanisms 55 are provided between the respective guide surfaces 25a of the guide frames 25 and the outer surfaces 33b and 34b of the first and second cam frames 33 and 34, the outer surfaces 33b and 34b facing the guide surfaces 25a. That is, the guide mechanisms 50 and 55 are provided adjacent to each other in the thickness direction D such that the first guide mechanism 50 is disposed closer to the first closed position and the second guide mechanism 55 is disposed closer to the second closed position.

The first guide mechanism 50 includes a first guide groove 51, which is recessed and provided in the outer surface 33b of the first cam frame 33, and first guide rollers 52, which are provided on the guide surface 25a of the guide frame 25, the guide surface 25a facing the first guide groove 51, and which are slidably fitted into the first guide groove 51. On the other hand, the second guide mechanism 55 includes a second guide groove 56, which is recessed and provided in the outer surface 34b of the second cam frame 34, and second guide rollers 57, which are provided on the guide surface 25a of the guide frame 25, the guide surface 25a facing the second guide groove 56, and which are slidably fitted into the second guide groove 56. In the present embodiment, the first guide mechanisms 50 are provided closer to the respective outer surfaces 33b of the pair of first cam frames 33, and the second guide mechanisms 55 are provided closer to the respective outer surfaces 34b of the pair of second cam frames 34.

The first guide groove 51 is provided so as to extend straight along the axis L from the upper end portion to the lower end portion of the first cam frame 33. In the present embodiment, the upper end of the guide groove 51 is open in the upper end face of the first cam frame 33. In addition, similarly, the second guide groove 56 is provided so as to extend straight along the axis L from the upper end portion to the lower end portion of the second cam frame 34. In the present embodiment, the upper end of the guide groove 56 is open in the upper end face of the second cam frame 34. Then, the guide grooves 51 and 56 have the same length in the direction along the axis L. In addition, the cam grooves 41 and 46 and the guide grooves 51 and 56 are disposed so as to partially overlap each other in the thickness direction D such that the sum of the depths of the cam groove 41 and the guide groove 51 formed in the cam frame 33 and the sum of the depths of the cam groove 46 and the guide groove 56 formed in the cam frame 34 are respectively smaller than the length between the inner surface 33a and the outer surface 33b of the cam frame 33 and the length between the inner surface 34a and the outer surface 34b of the cam frame 34. Thus, the valve drive mechanism 20 and the power transmission mechanism 30 are inhibited from increasing in size in the thickness direction D.

The two first guide rollers 52 arranged in the up-down direction along the axis L are provided at respective positions, closer to the first closed position, in the guide surface 25a of the guide frame 25. Similarly, the two second guide rollers 57 arranged in the up-down direction along the axis L are provided at respective positions, closer to the second closed position, in the guide surface 25a. Then, the distance between the pair of upper and lower first guide rollers 52 in the direction along the axis L is smaller than the length of the first guide groove 51 in the direction along the axis L. Similarly, the distance between the pair of upper and lower second guide rollers 57 in the direction along the axis L is smaller than the length of the second guide groove 56 in the direction along the axis L. In addition, the length of the first guide groove 51 and the second guide groove 56 in the direction along the axis L is larger than the sum of the distance between the retracted position and the intermediate position in the direction along the axis L and the distance, in the direction along the axis L, between the beginning end positions S1 and S2 and the terminal end positions E1 and E2 in the cam grooves 41 and 46.

The stoppers 60 are provided on respective upper end faces 35f of the pair of upper projections 35b of the lever member 35. The stoppers 60 each include a stop roller 61, which is capable of rolling in the thickness direction D, and a cushion 62 (FIGS. 5 and 6), which is provided on the part, facing the stop roller 61, of the second surface (lower surface) of the bonnet 5. That is, pairs of the stop roller 61 and the cushion 62 are provided on the respective left and right sides between which the valve shaft 6 is interposed in the width direction W. Thus, when the stop roller 61 comes into contact with the bonnet 5, the cushion 62 can absorb the shock.

Then, as illustrated in FIGS. 5 to 12, when the valve assembly 10 is moved upward along the axis L from the retracted position to the intermediate position by upward retracting operation of the first drive rod 22a or the second drive rod 23a, the stop roller 61 provided at the upper end of the lever member comes into contact with the cushion 62 provided on the second surface 5b of the bonnet 5, thus stopping upward movement along the axis L of the valve assembly 10. Subsequently, when the valve assembly 10 is moved in the thickness direction D from the intermediate position to the first closed position or the second closed position by the first opening and closing mechanism 40 or the second opening and closing mechanism 45, the stop roller 61 in contact with the cushion 62 rolls on the cushion 62 in the thickness direction D together with the movement.

In this manner, in the gate valve 1, the first opening and closing mechanism 40, which includes the first cam grooves 41 and the first cam rollers 42 and which causes the valve assembly 10 to reciprocate between the intermediate position and the first closed position, and the second opening and closing mechanism 45, which includes the second cam grooves 46 and the second cam rollers 47 and which causes the valve assembly 10 to reciprocate between the intermediate position and the second closed position, are disposed adjacent to each other in the thickness direction D. The gate valve 1 according to the present embodiment capable of moving the valve assembly 10 separately to the first closed position and the second closed position by using the two pairs of cam grooves 41 and 46 and cam rollers 42 and 47 in this manner enables a reduction in the height of the cam frames 33 and 34 compared with an existing one configured to move a valve assembly sequentially to the first closed position and the second closed position by using a pair of a cam groove and a cam roller. As a result, it is possible to reduce the height of the valve drive mechanism 20 and to thus reduce the height of the entire gate valve 1.

Figure 5:
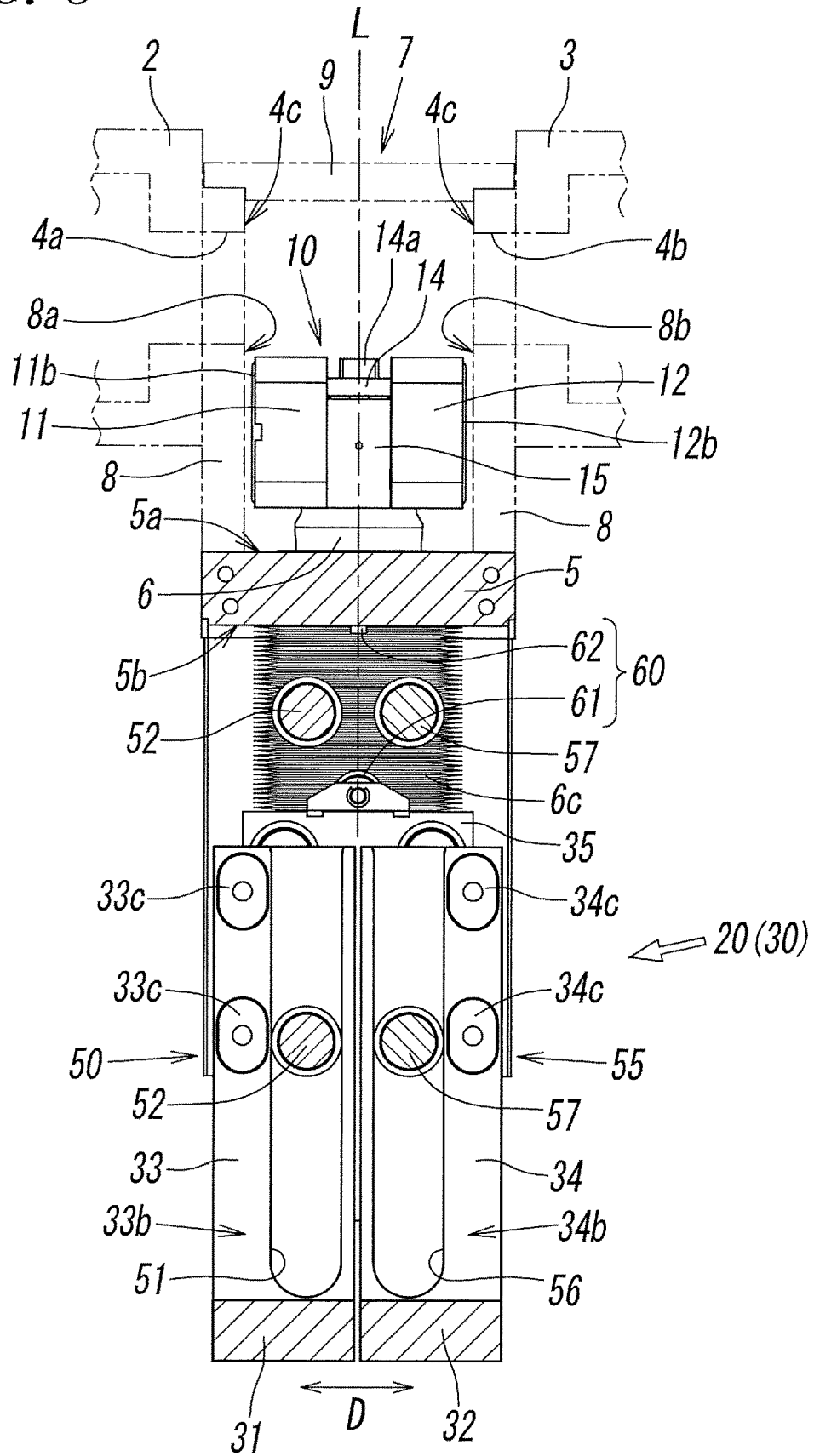
FIG. 5 is a schematic view illustrating the relationship between guide rollers and guide grooves when a valve assembly is located at a retracted position.
Figure 6:
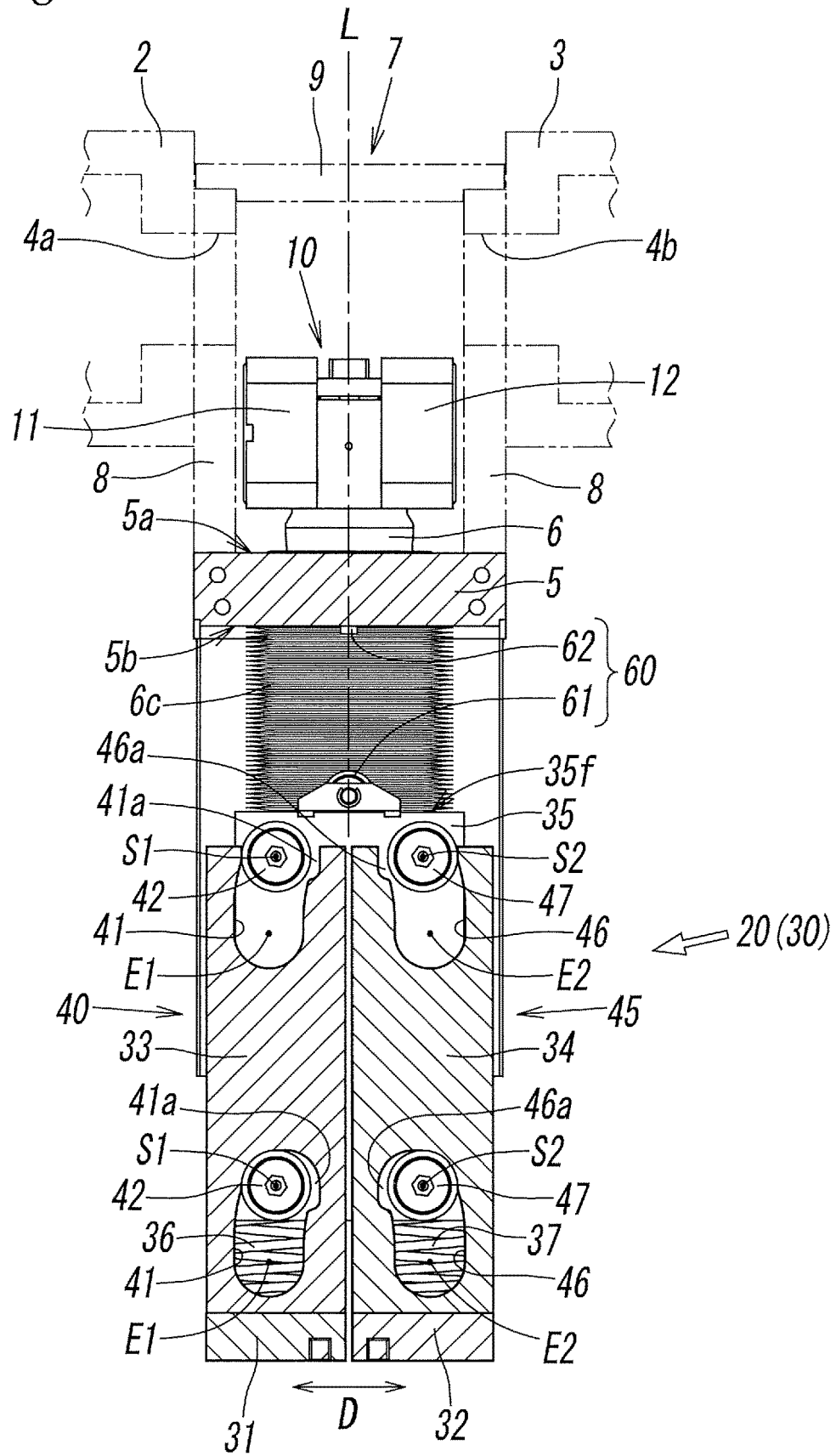
FIG. 6 is a schematic view illustrating the positional relationship between cam rollers and cam grooves when the valve assembly is located at the retracted position.

The operation of the gate valve 1 having such a configuration will be described. As illustrated in FIGS. 5 and 6, when the valve assembly 10 is located at the retracted position, both the first drive rod 22a and the second drive rod 23a of the air cylinder 21 advance to the lower stroke end. In this state, the lever member 35 is integrally supported on the first support frame 31 and the second support frame 32 by spring force (spring stiffness) of the first spring member 36 and the second spring member 37, and the first cam rollers 42 and the second cam rollers 47 are respectively disposed at the beginning end positions S1 and S2 in the first cam grooves 41 and the second cam grooves 46 by the spring force of the spring members 36 and 37. Thus, the valve assembly 10 and the drive rods 22a and 23a are integrally connected via the support frames 31 and 32, the cam frames 33 and 34, and a lever member 35. In addition, of the pair of upper and lower first guide rollers 52 and the pair of upper and lower second guide rollers 57, only the guide rollers 52 and 57 disposed on a lower part are respectively fitted into the first guide groove 51 and the second guide groove 56.

Next, from this state, when air is supplied into the first cylinder hole 22b of the air cylinder 21 to drive the first drive rod 22a to retract upward in the direction along the axis L, a "rod-side assembly", which is formed by each first drive rod 22a, each second drive rod 23a, the first support frame 31, the second support frame 32, each first cam frame 33, and each second cam frame 34, and a "shaft-side assembly", which is formed by the lever member 35, the valve shaft 6, and the valve assembly 10, move upward in the direction along the axis L together. Then, the valve assembly 10 moves upward on the axis L from the retracted position and reaches the intermediate position illustrated in FIGS. 7 and 8 (the position where the first valve plate 11 and the second valve plate 12 respectively face the first opening 4a and the second opening 4b of the valve casing 7 and where the valve sealing members 11b and 12b of the valve plates are separated from respective valve seats 4c of the openings 4a and 4b).

Figure 7:
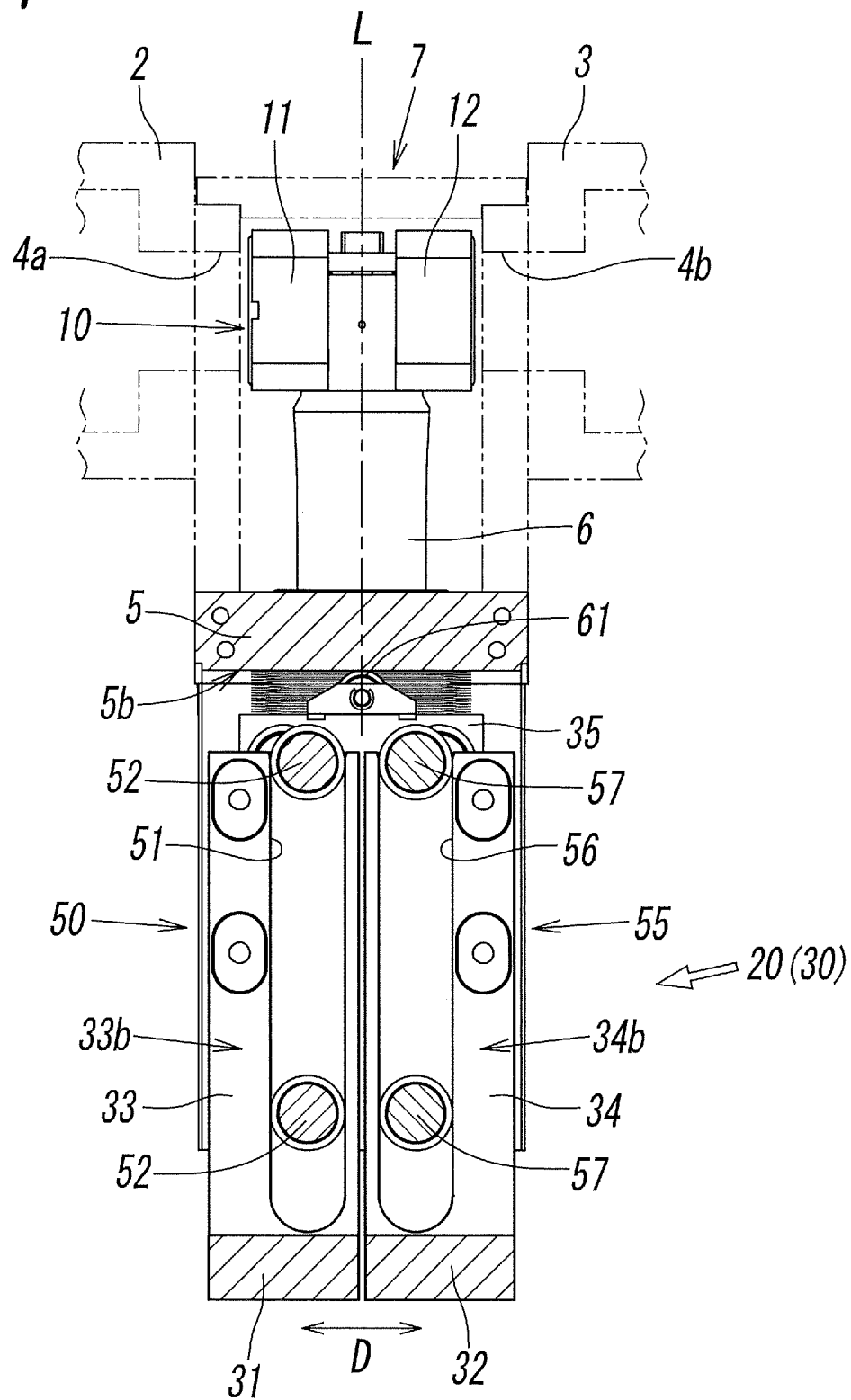
FIG. 7 is a schematic view illustrating the relationship between the guide rollers and the guide grooves when the valve assembly is located at an intermediate position.

Meanwhile, as illustrated in FIG. 5, both the first cam frame 33 and the second cam frame 34 are guided along the axis L by the lower first guide roller 52 and the lower second guide roller 57 fitted into the first guide groove 51 and the second guide groove 56. Thus, it is possible to move the valve shaft 6 upward along the axis L without being inclined relative to the axis L. Then, as illustrated in FIG. 7, when the valve assembly 10 reaches the intermediate position, the first guide roller 52 and the second guide roller 57 disposed on an upper part are also fitted into the first guide groove 51 and the second guide groove 56 from the upper end openings thereof. Simultaneously, the stop roller 61 of the lever member 35 comes into contact with the cushion 62 of the bonnet 5, thus stopping, at the position, upward movement in the direction along the axis L of the "shaft-side assembly". As a result, upward movement in the direction along the axis L from the retracted position of the valve assembly 10 is stopped at the intermediate position.

Thus, when air supply into the first cylinder hole 22b continues in such a state in which the valve assembly 10 is located at the intermediate position, a "first assembly", which is formed by each first drive rod 22a, the first support frame 31, and each first cam frame 33, of the "rod-side assembly" further continues to move upward while compressing the first spring member 36. On the other hand, a "second assembly", which is formed by each second drive rod 23a, the second support frame 32, and each second cam frame 34, of the "rod-side assembly" stops at the position.

Figure 10:
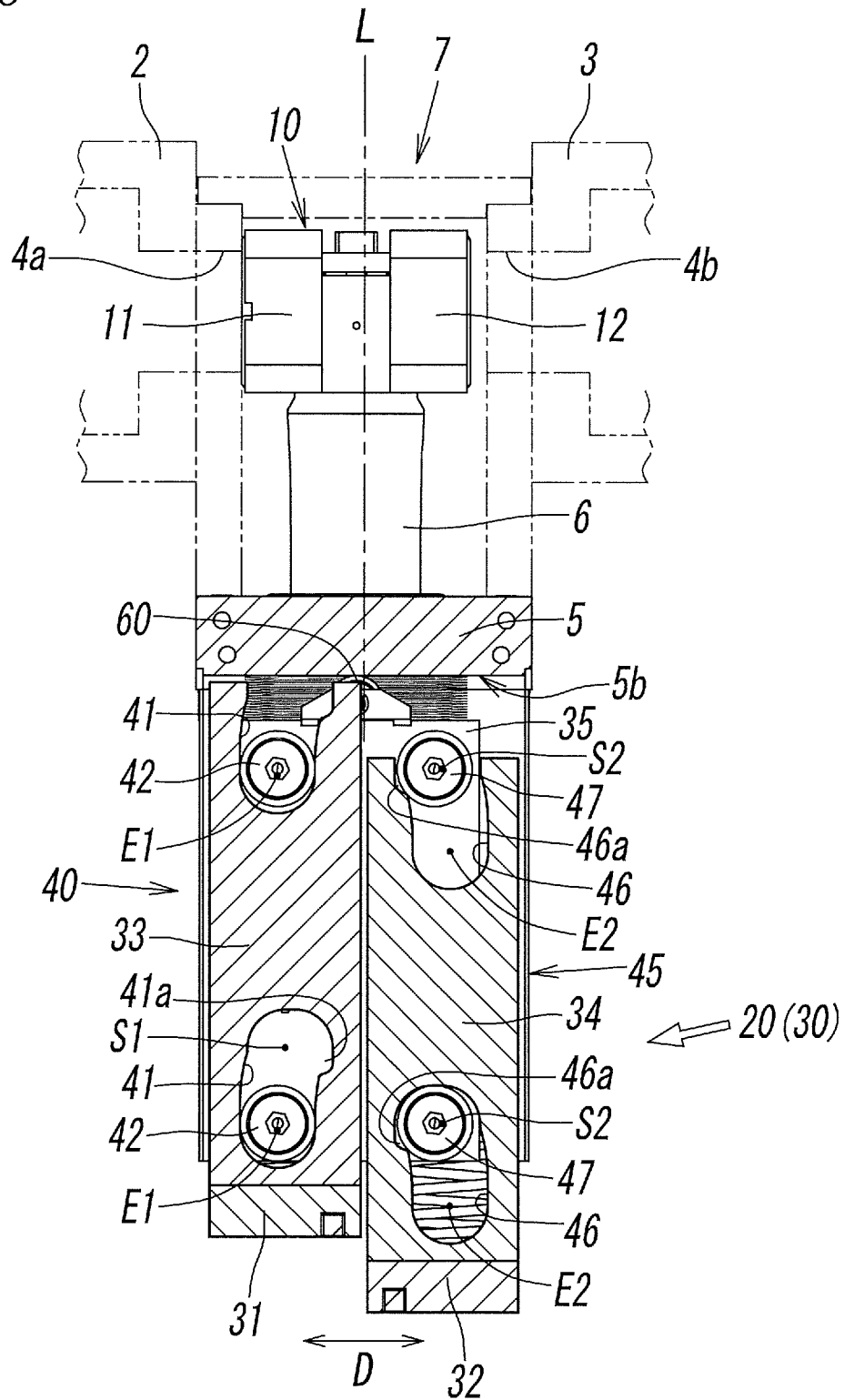
FIG. 10 is a schematic view illustrating the positional relationship between the cam rollers and the cam grooves when the valve assembly is located at the first closed position.

Then, the pair of upper and lower first cam grooves 41 formed in the first cam frame 33 move upward relative to the pair of upper and lower first cam rollers 42 fitted thereinto until the first drive rod 22a reaches the upper stroke end. Then, as illustrated in FIG. 10, in the pair of upper and lower first cam grooves 41, the pair of upper and lower first cam rollers 42 located at the beginning end position S1 move to the terminal end position E1. Then, the first cam rollers 42 move toward the first closed position in the thickness direction D orthogonal to the direction along the axis L so as to follow the respective cam grooves 41.

Figure 9:
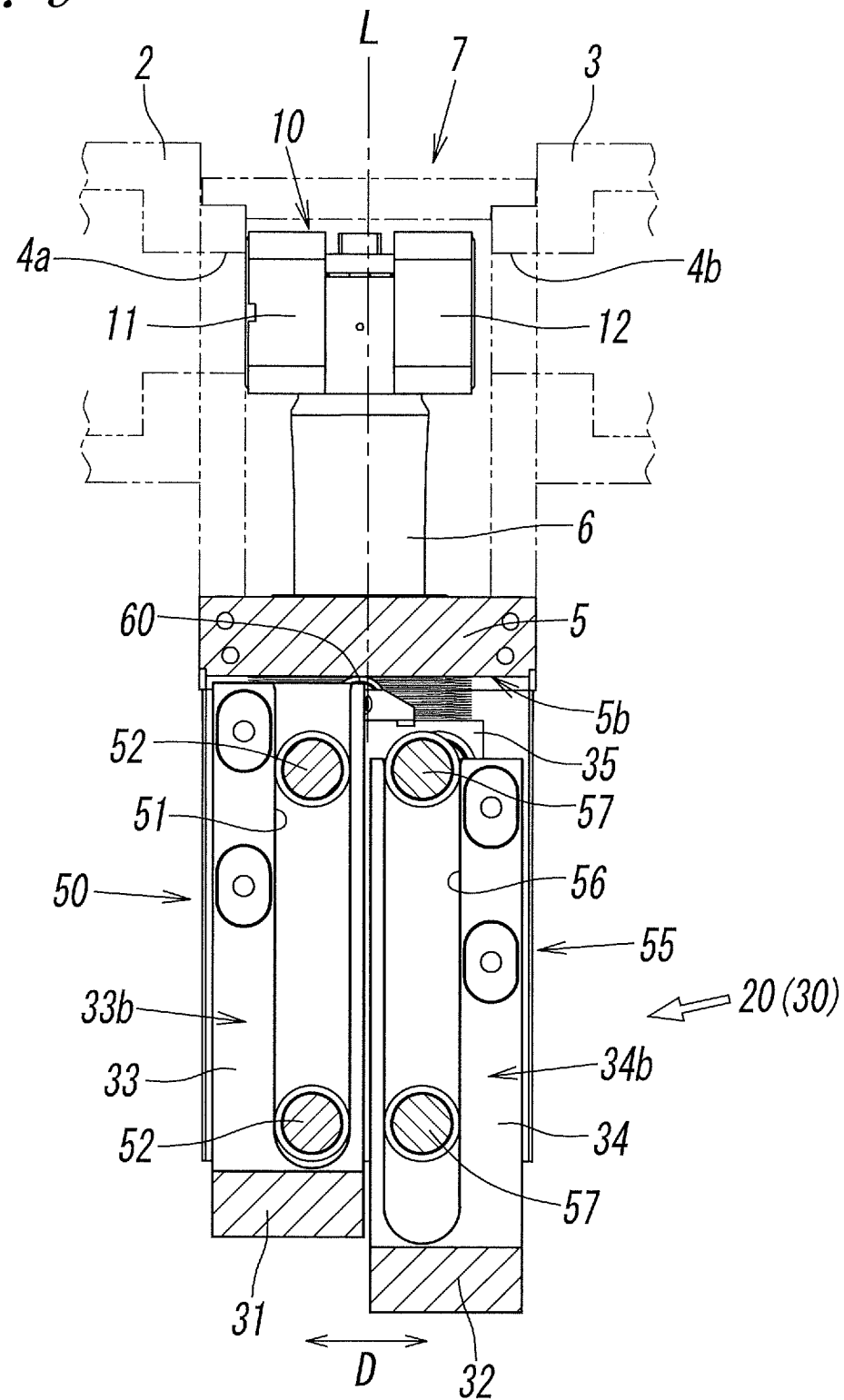
FIG. 9 is a schematic view illustrating the relationship between the guide rollers and the guide grooves when the valve assembly is located at a first closed position.

As a result, as illustrated in FIGS. 9 and 10, the entire "shaft-side assembly" including the valve assembly 10 is displaced in the thickness direction D orthogonal to the axis L from the intermediate position to the first closed position where the first opening 4a of the valve casing 7 is closed by the first valve plate 11. Then, the pair of upper and lower second cam rollers 47 provided on the lever member 35 also move toward the first closed position together with the movement of the "shaft-side assembly" and, as described above, move, in the second cam grooves 46, from the beginning end position S2 to the second recesses 46a provided so as to be recessed from the beginning end position S2 toward the first closed position.

Figure 8:
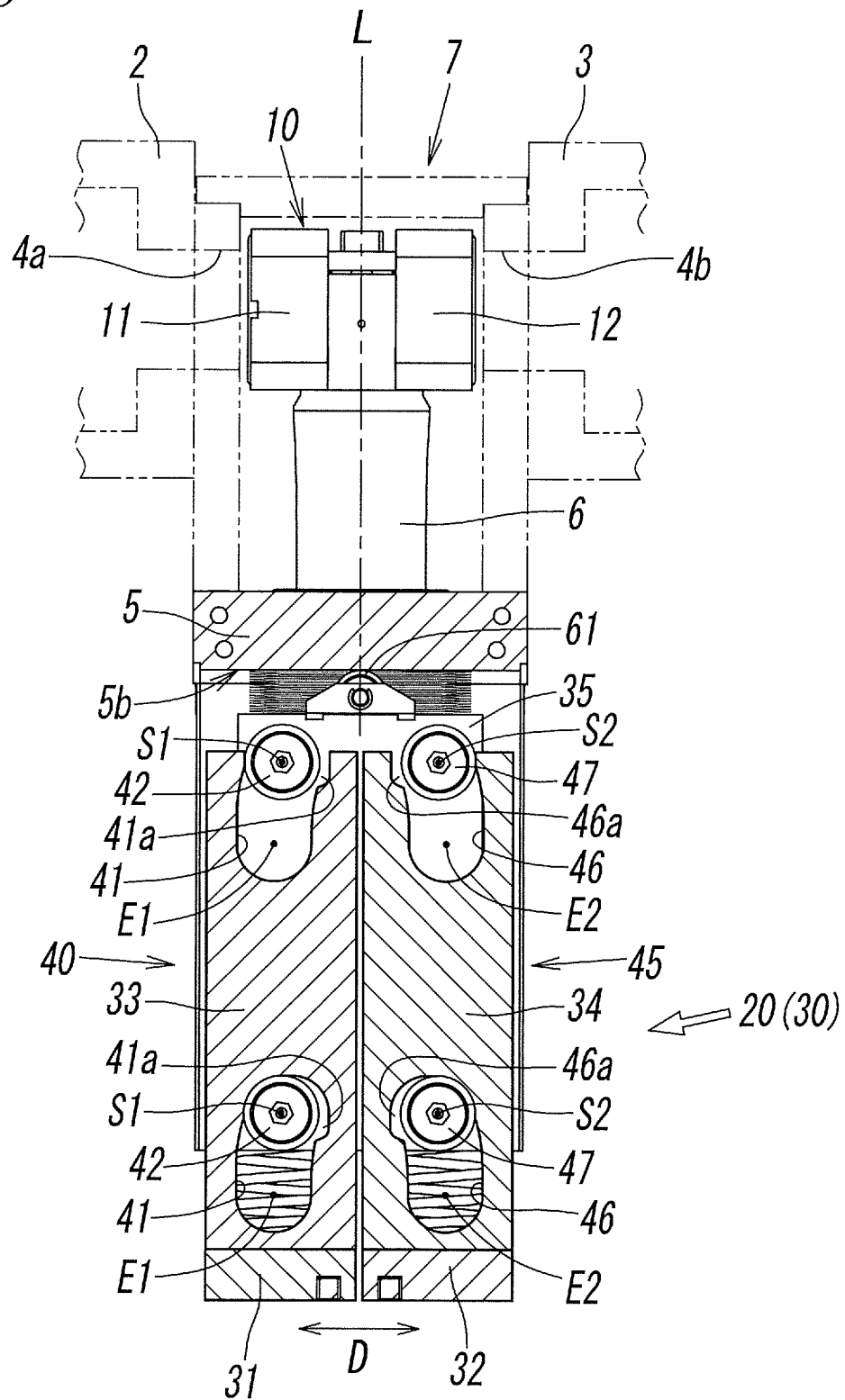
FIG. 8 is a schematic view illustrating the positional relationship between the cam rollers and the cam grooves when the valve assembly is located at the intermediate position.

On the contrary, when air is supplied into the second cylinder hole 23b to drive the second drive rod 23a to retract upward in the direction along the axis L, the valve assembly 10 moves from the retracted position of the valve assembly 10 illustrated in FIGS. 5 and 6 to the intermediate position illustrated in FIGS. 7 and 8 as in the case in which the first drive rod 22a is driven to retract. Then, when air supply into the second cylinder hole 23b continues in the state in which the valve assembly 10 is located at the intermediate position, the "second assembly" of the "rod-side assembly" further continues to move upward while compressing the second spring member 37. On the other hand, the "first assembly" of the "rod-side assembly" stops at the position.

Figure 12:
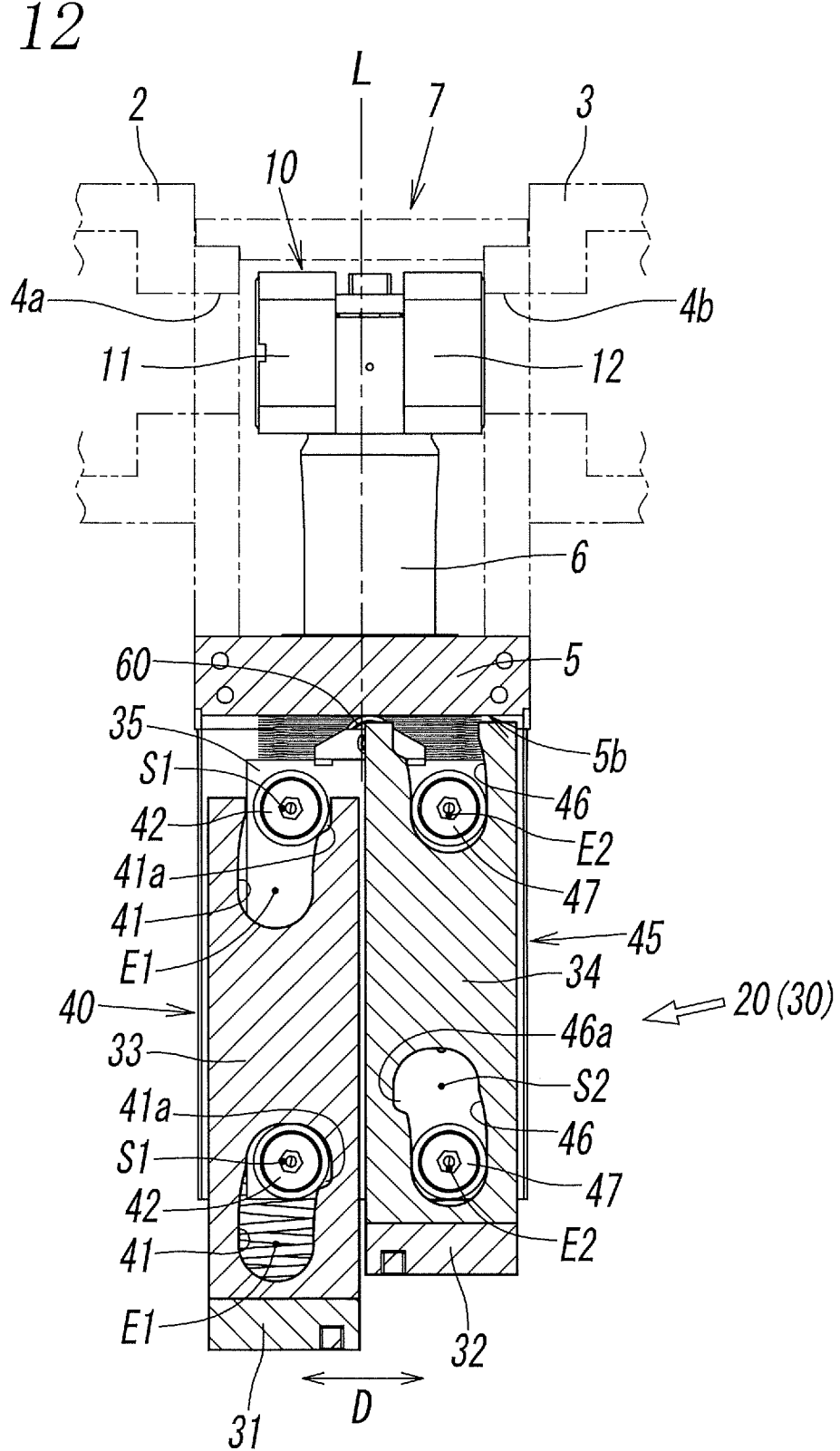
FIG. 12 is a schematic view illustrating the positional relationship between the cam rollers and the cam grooves when the valve assembly is located at the second closed position.

Then, the pair of upper and lower second cam grooves 46 formed in the second cam frame 34 move upward relative to the pair of upper and lower second cam rollers 47 fitted thereinto until the second drive rod 23a reaches the upper stroke end. Then, as illustrated in FIG. 12, in the pair of upper and lower second cam grooves 46, the pair of upper and lower second cam rollers 47 located at the beginning end position S2 move to the terminal end position E2. Then, the second cam rollers 47 move toward the second closed position in the thickness direction D orthogonal to the direction along the axis L so as to follow the respective cam grooves 46.

Figure 11:
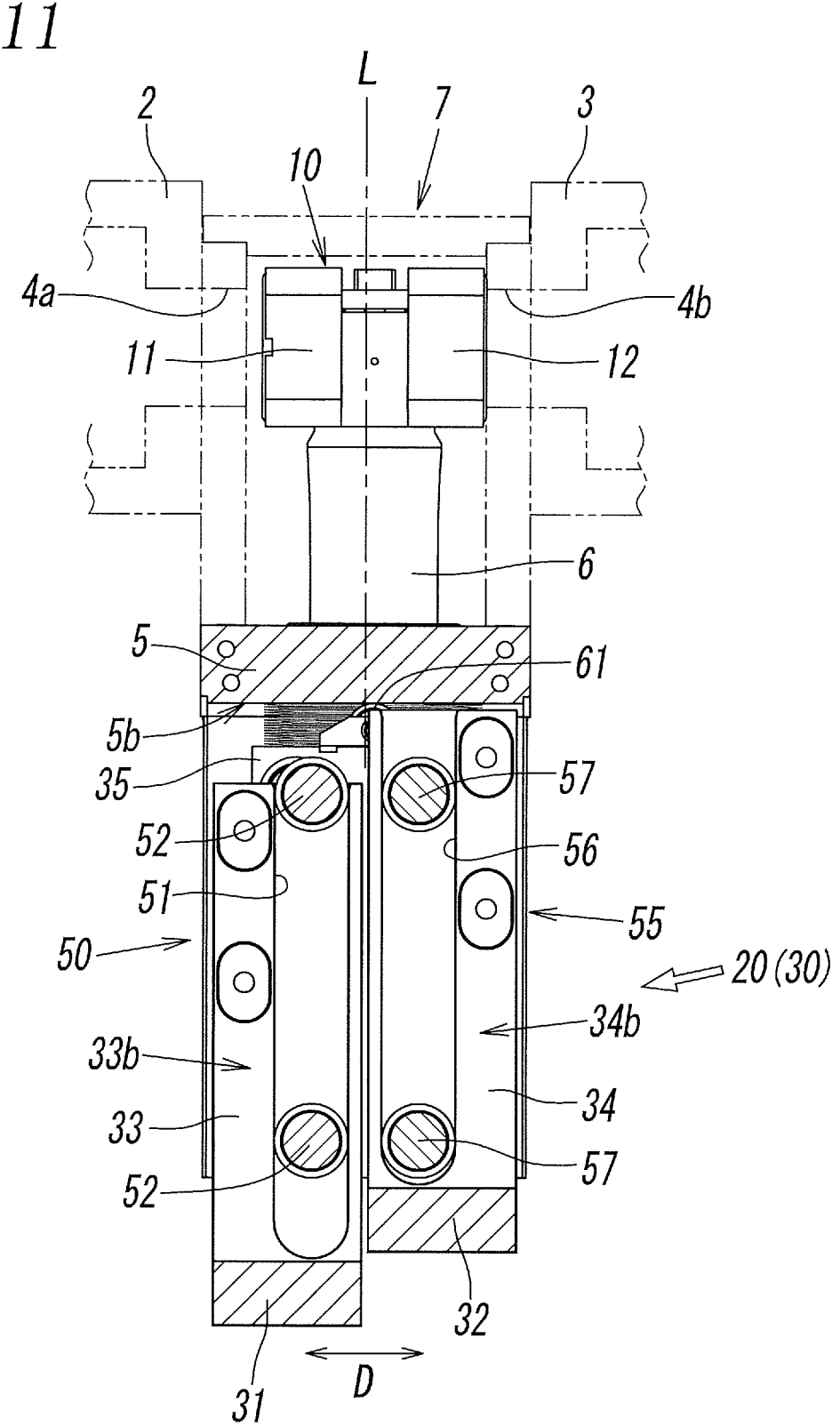
FIG. 11 is a schematic view illustrating the relationship between the guide rollers and the guide grooves when the valve assembly is located at a second closed position.

As a result, as illustrated in FIGS. 11 and 12, the entire "shaft-side assembly" including the valve assembly 10 is displaced in the thickness direction D orthogonal to the axis L from the intermediate position to the second closed position where the second opening 4b of the valve casing 7 is closed by the second valve plate 12. Then, the pair of upper and lower first cam rollers 42 provided on the lever member 35 also move toward the second closed position together with the movement of the "shaft-side assembly" and, as described above, move, in the first cam grooves 41, from the beginning end position S1 to the first recesses 41a provided so as to be recessed from the beginning end position S1 toward the second closed position.

In addition, an operation in which the process described above is reversed is performed to return the valve assembly 10 from the first closed position or the second closed position (FIGS. 9 to 12) to the retracted position (FIGS. 5 and 6) via the intermediate position (FIGS. 7 and 8).

In this manner, in particular, when the valve assembly 10 is displaced from the intermediate position to the second closed position, the gate valve 1 is capable of directly displacing the valve assembly 10 to the second closed position without passing through the first closed position as ever. Thus, the gate valve 1 is also extremely excellent in the operability of the valve assembly 10. In addition, when the valve assembly 10 is displaced from the intermediate position to the first closed position and the second closed position, the entire "shaft-side assembly" moves in the thickness direction D orthogonal to the axis L. Thus, when the first valve plate 11 and the second valve plate 12 come into contact with and are separated from the first opening 4a and the second opening 4b of the valve casing 7, respectively, it is possible to inhibit, for example, twisting of the valve sealing members 11b and 12b and generation of abrasion powder.

The embodiment of the present invention has been specifically described above, but the present invention is not limited thereto. Needless to say, various design changes can be made without departing from the gist of the present invention.

For example, in the present embodiment, the "first assembly", which is formed by each first drive rod 22a, the first support frame 31, and each first cam frame 33, and the "second assembly", which is formed by each second drive rod 23a, the second support frame 32, and each second cam frame 34, are disposed adjacent to each other in the thickness direction D such that the "first assembly" is disposed closer to the first closed position and the "second assembly" is disposed closer to the second closed position. On the contrary, the "first assembly" may be disposed closer to the second closed position, and the "second assembly" may be disposed closer to the first closed position.

In addition, in the present embodiment, the first cam grooves 41 and the second cam grooves 46 are provided in the first cam frame 33 and the second cam frame 34, and the first cam rollers 42 and the second cam rollers 47 are provided on the lever member 35. On the contrary, the cam grooves 41 and 46 may be provided in the lever member 35, and the cam rollers 42 and 47 may be provided on the cam frames 33 and 34. Then, in the present embodiment, the first guide groove 51 and the second guide groove 56 are provided in the cam frames 33 and 34, and the first guide rollers 52 and the second guide rollers 57 are provided on the guide frame 25, which is integrally formed with the cylinder body 24. On the contrary, the guide grooves 51 and 56 may be provided in the guide frame 25, and the guide rollers 52 and 57 may be provided on the cam frames 33 and 34. In addition, the guide frame 25 can be formed separately from the cylinder body 24.

Furthermore, in the present embodiment, the pairs of upper and lower cam grooves 41 and 46 formed in the cam frames 33 and 34 have the same profile, and the entire "shaft-side assembly" is thus moved in the thickness direction D orthogonal to the axis L when the valve assembly 10 is displaced from the intermediate position to the first closed position and the second closed position. However, each upper one and each lower one of the pairs of upper and lower cam grooves 41 and 46 may have different profiles, and the "shaft-side assembly" may thus be inclined relative to the axis L when the valve assembly 10 is displaced from the intermediate position to the first closed position and the second closed position.

In addition, the materials forming the respective components of the gate valve 1 according to the present embodiment are not necessarily limited to the materials described above, and appropriate materials therefor can be adopted as needed.

Furthermore, in the present embodiment, components such as the power transmission mechanism 30 and the first and second cam frames 33 and 34 are formed symmetrically in the thickness direction D and the width direction W. As a result, the entire gate valve 1 is also formed substantially symmetrically in the thickness direction D and the width direction W. However, each configuration thereof is not necessarily limited thereto and may be asymmetrical.

REFERENCE SIGNS LIST 1 gate valve
5 bonnet
6 valve shaft
6a tip end portion
6b base end portion
10 valve assembly
11 first valve plate
12 second valve plate
20 valve drive mechanism
21 air cylinder
22a first drive rod
23a second drive rod
25 guide frame
30 power transmission mechanism
31 first support frame
32 second support frame
33 first cam frame
34 second cam frame
35 lever member
36 first spring member
37 second spring member
40 first opening and closing mechanism
41 first cam groove
41a first recess
42 first cam roller
45 second opening and closing mechanism
46 second cam groove
46a second recess
47 second cam roller
50 first guide mechanism
51 first guide groove
52 first guide roller
55 second guide mechanism
56 second guide groove
57 second guide roller
60 stopper
S1, S2 beginning end position
E1, E2 terminal end position
L axis

The invention claimed is:

1. A gate valve disposed between a first chamber and a second chamber adjacent to each other, the gate valve being usable for causing a first opening communicating with the first chamber and a second opening communicating with the second chamber to communicate with each other and for opening and closing the first opening and the second opening separately, the gate valve comprising:
   a bonnet partitioning off an upper side and a lower side;
   a valve shaft passing through the bonnet in a direction along an axis extending in an up-down direction, the valve shaft having a tip end portion disposed above the bonnet and a base end portion disposed below the bonnet;
   a valve assembly formed by attaching a first valve plate and a second valve plate back to back to the tip end portion of the valve shaft; and
   a valve drive mechanism connected to the base end portion of the valve shaft, the valve drive mechanism being configured to move the valve assembly by operation of the valve shaft, wherein
   the valve drive mechanism includes an air cylinder including a first drive rod and a second drive rod capable of being driven separately, the air cylinder being fixedly provided to the bonnet, and a power transmission mechanism connecting the valve shaft and both the first drive rod and the second drive rod, the power transmission mechanism being configured to transmit driving force of the air cylinder to the valve shaft and is thus capable of moving the valve assembly in the direction along the axis and a thickness direction orthogonal to the axis to move the valve assembly to a first closed position for closing the first opening with the first valve plate, a second closed position for closing the second opening with the second valve plate, and a retracted position for causing the openings to communicate with each other, the power transmission mechanism includes a first cam frame connected to the first drive rod to operate together with the first drive rod, a second cam frame connected to the second drive rod to operate together with the second drive rod, a lever member attached to the base end portion of the valve shaft, and a first opening and closing mechanism and a second opening and closing mechanism configured to separately cause the valve assembly to reciprocate in the thickness direction, the first opening and closing mechanism includes a first cam groove provided in one of the first cam frame and the lever member, and a first cam roller provided on another of the first cam frame and the lever member, the first cam roller being slidably fitted into the first cam groove, and the second opening and closing mechanism includes a second cam groove provided in one of the second cam frame and the lever member, and a second cam roller provided on another of the second cam frame and the lever member, the second cam roller being slidably fitted into the second cam groove, the first cam roller reciprocates together with reciprocation of the first drive rod so as to follow the first cam groove, thus causing the valve assembly to reciprocate between a position occupied by the retracted position and a position occupied by the first closed position in the thickness direction, and the second cam roller reciprocates together with reciprocation of the second drive rod so as to follow the second cam groove, thus causing the valve assembly to reciprocate between the position occupied by the retracted position and a position occupied by the second closed position in the thickness direction, the gate valve has a width direction orthogonal to both the direction along the axis and the thickness direction, and at the first opening and closing mechanism and the second opening and closing mechanism, the first and second cam frames are disposed on both sides of the lever member in the width direction and are provided on both the sides of the lever member so as to be adjacent to each other in the thickness direction.

2. The gate valve according to claim 1, wherein the first cam groove has a first recess for letting the first cam roller therein when the valve assembly is moved to the second closed position, and the second cam groove has a second recess for letting the second cam roller therein when the valve assembly is moved to the first closed position.

3. The gate valve according to claim 1, wherein
the valve assembly is capable of further moving to an intermediate position located between the position occupied by the retracted position and the position occupied by the first and second closed positions in the direction along the axis, the power transmission mechanism further includes a first spring member and a second spring member provided between the lever member and both the first drive rod and the second drive rod to transmit driving force of the first drive rod to the lever member through the first spring member and to transmit driving force of the second drive rod to the lever member through the second spring member, the power transmission mechanism further includes a stopper configured to, when the valve assembly reaches the intermediate position from the retracted position by driving of the air cylinder, stop operation of the lever member in the direction along the axis and allow the lever member to be operated in the thickness direction by the opening and closing mechanisms, and in a state in which the operation of the lever member in the direction along the axis is stopped by the stopper, the opening and closing mechanisms are configured to separately cause the valve assembly to reciprocate between the intermediate position and the first and second closed positions when the first and second drive rods are separately driven.

4. The gate valve according to claim 3, wherein the intermediate position is located at the position occupied by the first and second closed positions in the direction along the axis.

5. The gate valve according to claim 3, wherein
the gate valve has a width direction orthogonal to both the direction along the axis and the thickness direction, at the first opening and closing mechanism and the second opening and closing mechanism, the first and second cam frames are disposed on both sides of the lever member in the width direction and are provided on both the sides of the lever member so as to be adjacent to each other in the thickness direction, and a first support frame and a second support frame relatively movably connected to the lever member are respectively attached to the first drive rod and the second drive rod, and a pair of the first cam frames are provided upright in the direction along the axis from the first support frame, the first support frame and the lever member being connected by the first spring member between the pair of the first cam frames in the width direction, and a pair of the second cam frames are provided upright in the direction along the axis from the second support frame, the second support frame and the lever member being connected by the second spring member between the pair of the second cam frames in the width direction.

6. The gate valve according to claim 5, wherein the first cam groove has a first recess for letting the first cam roller therein when the valve assembly is moved from the intermediate position to the second closed position, and the second cam groove has a second recess for letting the second cam roller therein when the valve assembly is moved from the intermediate position to the first closed position.

7. The gate valve according to claim 5, wherein
the power transmission mechanism further includes a guide frame fixedly provided to the bonnet, and first and second guide mechanisms provided between the guide frame and the first and second cam frames, the first and second guide mechanisms being configured to guide the first and second cam frames so as to move in the direction along the axis, and the first guide mechanism includes a first guide groove provided, along the axis, in one of the guide frame and the first cam frame, and a first guide roller provided on another of the guide frame and the first cam frame, the first guide roller being slidably fitted into the first guide groove, and the second guide mechanism includes a second guide groove provided, along the axis, in one of the guide frame and the second cam frame, and a second guide roller provided on another of the guide frame and the second cam frame, the second guide roller being slidably fitted into the second guide groove.

8. The gate valve according to claim 7, wherein the guide frame is disposed on both the sides of the lever member in the width direction so as to be located outside, in the width direction, the first and second cam frames provided adjacent to each other in the thickness direction.

9. The gate valve according to claim 8, wherein
the air cylinder is disposed on both the sides of the lever member in the width direction so as to be drooped from the bonnet along the axis, and the guide frame is disposed inside each air cylinder in the width direction,
the first drive rod and the second drive rod are provided to each of a pair of the air cylinders so as to be adjacent to each other in the thickness direction, and
the first drive rods of the pair of the air cylinders are attached to respective end portions of the first support frame, and the second drive rods of the pair of the air cylinders are attached to respective end portions of the second support frame.

* * * * *